United States Patent
Peh et al.

(10) Patent No.: US 9,509,152 B2
(45) Date of Patent: Nov. 29, 2016

(54) METHOD AND APPARATUS FOR SELF-HEATING OF A BATTERY FROM BELOW AN OPERATING TEMPERATURE

(71) Applicant: MOTOROLA SOLUTIONS, INC, Schaumburg, IL (US)

(72) Inventors: Tee Howe Peh, Butterworth (MY); Modh Hisham Muddin Bin Che At, Bandar Baharu (MY); Kah Kheng Khoo, Butterworth (MY); MacWien Krishnamurthi, Shah Alam (MY); Poh Huat Low, Bukit Mertajam (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 216 days.

(21) Appl. No.: 14/454,019

(22) Filed: Aug. 7, 2014

(65) Prior Publication Data
US 2016/0043447 A1  Feb. 11, 2016

(51) Int. Cl.
*H02J 7/00* (2006.01)
*H01M 10/6571* (2014.01)
*H01M 10/052* (2010.01)
*H01M 10/48* (2006.01)
*H01M 10/63* (2014.01)
*H01M 10/615* (2014.01)
*H01M 10/623* (2014.01)

(52) U.S. Cl.
CPC .......... *H02J 7/0013* (2013.01); *H01M 10/052* (2013.01); *H01M 10/486* (2013.01); *H01M 10/615* (2015.04); *H01M 10/623* (2015.04); *H01M 10/63* (2015.04); *H01M 10/6571* (2015.04); *H01M 2220/30* (2013.01); *Y02E 60/122* (2013.01)

(58) Field of Classification Search
CPC ............. B60L 11/1875; H02J 7/0013; H01M 10/6571; H01M 10/615
USPC .......................... 320/112, 136, 150, 153, 154
See application file for complete search history.

(56) References Cited

U.S. PATENT DOCUMENTS

| | | | |
|---|---|---|---|
| 4,926,106 A | 5/1990 | Tanis | |
| 6,002,240 A | 12/1999 | McMahan | |
| 7,327,122 B2 | 2/2008 | Kamenoff | |
| 7,671,567 B2 | 3/2010 | Eberhard | |
| 8,614,565 B2 | 12/2013 | Lubawy | |
| 8,653,790 B2 | 2/2014 | Johnson | |
| 8,659,666 B2 | 2/2014 | Ishibashi | |
| 2005/0206342 A1* | 9/2005 | Aleyraz | H01M 8/04365 320/101 |
| 2006/0260840 A1* | 11/2006 | Kim | H05K 5/02 174/377 |
| 2007/0241091 A1* | 10/2007 | Woodward | D06F 75/02 219/251 |
| 2010/0207297 A1* | 8/2010 | Sadlier | B65D 41/22 264/292 |
| 2015/0180257 A1* | 6/2015 | Snyder | H01M 10/441 320/103 |
| 2015/0375230 A1* | 12/2015 | Spangler | B01L 7/5255 435/91.2 |

FOREIGN PATENT DOCUMENTS

CA  2638817 C  5/2010

* cited by examiner

*Primary Examiner* — Paul Dinh
(74) *Attorney, Agent, or Firm* — Barbara R. Doutre; Scott M. Garrett

(57) ABSTRACT

A method and apparatus for a self-heating battery pack uses a battery cells of a first battery cell circuit to power a device. However these battery cells become substantially inoperative below a very cold temperature, so a second battery cell circuit, having a second type of battery cells which can operate at the cold temperature, is used to power a heating element to warm up the first battery cells to a temperature at which they can operate.

26 Claims, 3 Drawing Sheets

METHOD AND APPARATUS FOR SELF-HEATING OF A BATTERY FROM BELOW AN OPERATING TEMPERATURE

FIELD OF THE DISCLOSURE

The present disclosure relates generally to batteries for use with portable electronic devices, and more particularly to rechargeable batteries for use in very cold ambient temperatures that will render some high capacity type battery chemistries inoperative.

BACKGROUND

Rechargeable batteries are used to power a large number of different portable electronic devices. Presently, lithium-based battery technologies, such as lithium-ion, are very popular due to their superior energy storage capacity compared to earlier battery types such as nickel-based batteries (e.g. nickel-cadmium, nickel metal hydride). The higher energy storage density of lithium-based batteries has facilitated smaller and lower weight portable systems.

However, lithium-based battery technologies, while outperforming nickel-based battery technologies under nominal conditions, fall behind under some conditions. In particular, in very cold temperatures lithium-based systems are, in some applications, unable to deliver power at a rate required by the portable device they are powering, particularly portable devices that can have high current periods, such as portable two-way radio devices. In cases where operation is critical, it is necessary that a battery technology be able to deliver power to its host device.

Accordingly, there is a need for a method and apparatus for allowing utilization of a high energy density battery technology when it is below its operating temperature.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
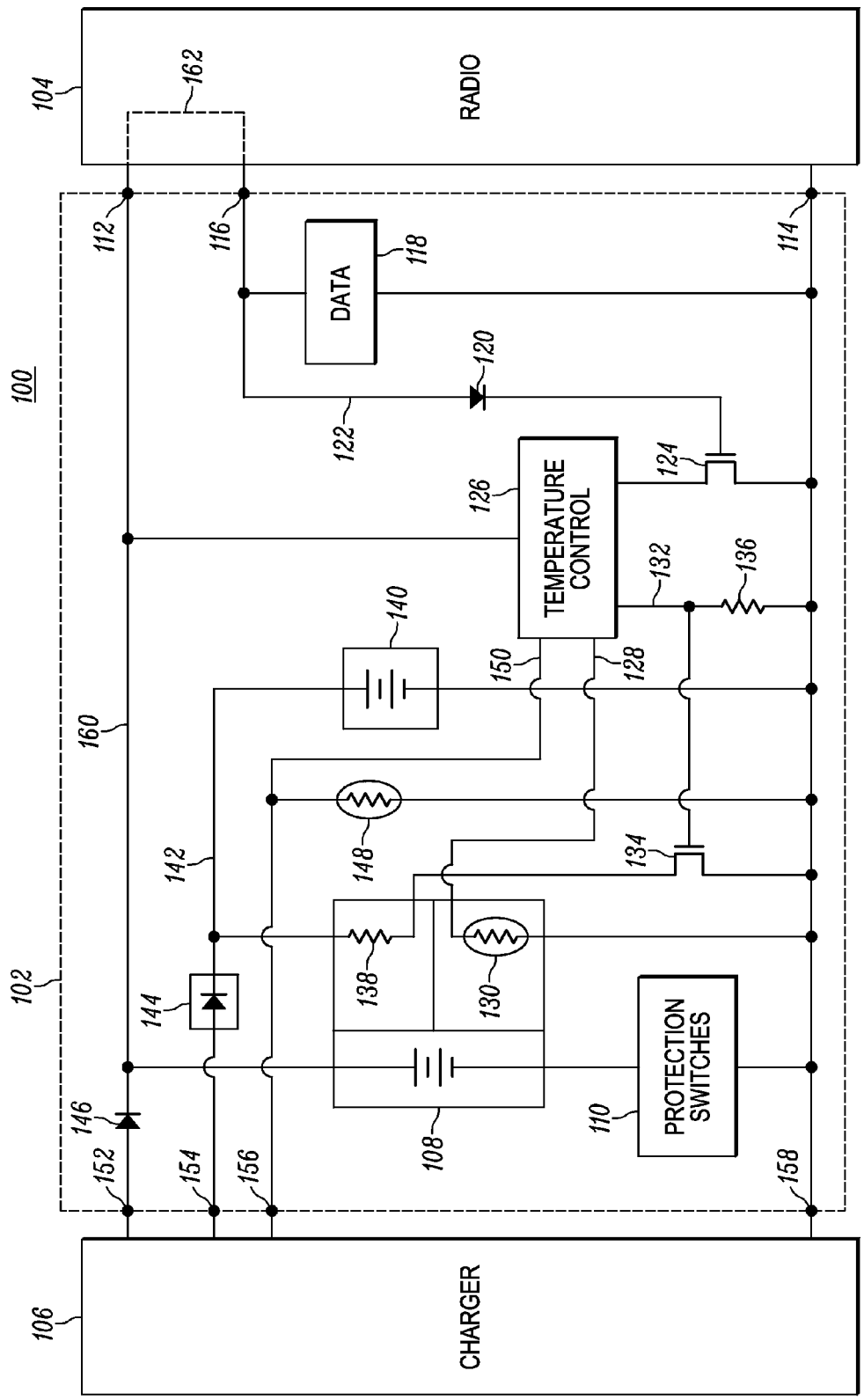
FIG. 1 is a block diagram of self-heating battery system in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments disclosed herein include a self-heating battery pack that includes a first battery cell circuit having at least one battery cell of a first chemistry, and having a positive terminal coupled to a positive device contact and a negative terminal coupled to the negative device contact. The cells of the first battery cell circuit are rendered substantially inoperative when they are below a minimum operating temperature. The self-heating battery pack further includes a heating circuit that has a second battery cell circuit comprised of at least one battery cell of a second chemistry that is operable below the minimum operating temperature of the first battery cell circuit. The heating circuit further includes a heating element that is located in proximity to the first battery cell circuit and which is powered by the second battery cell circuit. The self-heating battery pack further includes a thermal control circuit that senses a temperature of the first battery cell circuit and enables the heating circuit when the temperature of the battery is below a lower temperature threshold and disables the heating circuit when the temperature is above an upper threshold, and which is enabled by a signal from the auxiliary device contact.

FIG. 1 is a block diagram of self-heating battery system 100 in accordance with some embodiments. The system 100 includes a battery 102 and can further include a device 104 that is powered by the battery 102, and a charger 106 that can be used to recharge the electrochemical storage cells in the battery 102. The battery 102 can be packaged in a unitary battery pack which can be mechanically coupled to the device 104, allowing the device 104 to be operated as a portable device. The battery 102, device 104, and charger 106 are individual units that can be connected together. That is, the battery 102 can be connected to the device 104 to power the device and facilitate portability of the device. The battery 102 can be connected to the charger 106 while either connected to the device 104 or when not connected to the device 104. Power for the device 104 comes from a first battery cell circuit 108 which includes one or more battery cells of a first chemistry. For example, the first battery cell circuit 108 can employ lithium-based battery cells, such as lithium ion battery cells, which are presently in common usage due to their superior energy storage density compared to older conventional battery chemistries, such as, for example, nickel-based battery cells. The battery cells of the first battery cell circuit 108 can be charged through a first positive charger contact 152 that interfaces with a corresponding contact of the charger 106. A discharge prevention diode 146 can be connected in series between the first positive charging contact 152 and the first battery cell circuit 108. The discharge prevention diode 146 and the first battery cell circuit 108 are connected at a line 160 over which voltage and current can be delivered to the device 104 via a positive device contact 112 that mates with a corresponding contact of the device 104. A protection switch circuit 110 is further coupled in series with the first battery cell circuit 108, between the first battery cell circuit 108 and a return or ground line that is shared by a negative charger contact 158 and a negative device contact 114. The protection switch circuit 110 includes switch and control circuitry to prevent the battery cells of the first battery cell circuit 108 from experiencing overvoltage or undervoltage conditions, as is known.

The battery cells of the first battery cell circuit, while offering a relatively high energy storage capacity among battery cell types that are commercially manufactured for portable applications, can be affected by extreme cold temperatures. For example, commercial lithium ion cells, according to some sources, lose approximately 50% of their capacity at around −18 degrees Celsius due to the increase of internal resistance. At −30 degrees Celsius commercial lithium ion batteries can be substantially unusable for all but very low current applications. Depending on the application, the loss of capacity, or even loss of the ability to operate, can be a significant problem. For example, many police and public safety two-way radio devices are powered by lithium-based batteries, and can be used in very cold environments. Communication by and amongst such personnel is critical to police and public safety operations.

In accordance with the embodiments, to prevent loss of operation and augment the useable discharge capacity of the first battery cell circuit 108, a heating circuit in used which includes a second battery cell circuit 140. The second battery cell circuit 140 provides energy to heat up the first battery cell circuit 108. The second battery cell circuit 140 comprises one or more battery cells of a second chemistry that is less susceptible to discharge degradation due to cold temperatures such as nickel-based chemistries. For example, it is known that nickel metal hydride and nickel cadmium battery cells can operate effectively at temperatures as low as −40 degrees Celsius. The second battery cell circuit 140 is coupled to a resistive heating element 138 via line 142. The resistive heating element 138 is disposed in thermal proximity to the cells of the first battery cell circuit 108, meaning that the resistive heating element 138 is optimally placed to transfer heat produced by the resistive heating element 138 into the cells of the first battery cell circuit 108. The cells of the first battery cell circuit 108 and the resistive heating element 138 should be separated by an electrical insulator to prevent any short circuiting, but in general, the distance between the resistive heating element 138 and the cells of the first battery cell circuit should be on the order of millimeters or less. The resistive heating element 138 can be activated by a switch 134 that is connected between the resistive heating element 138 and the return line. The switch 134 can be, for example, a N-type metallic oxide semiconductor field effect transistor (MOSFET). The switch 134 can be controlled by a temperature control circuit 126, such as by an output 132 that is normally pulled low by a pull down resistor 136.

The temperature control circuit 126 can sense the temperature of the cells of the first battery cell circuit 108 by, for example, a thermistor 130 that is also located in thermal proximity to the cells of the first battery cell circuit 108, via line 128. However, it is preferred if the thermistor 130 is not located close to the resistive heating element 138 so as to more accurately sense the temperature of the cells of the first battery cell circuit 108 rather than the temperature of the resistive heating element 138. When the temperature control circuit is activated, and the thermistor 130 indicates the cells of the first battery cell circuit 108 are below a lower temperature threshold (e.g. −30 degrees Celsius), the temperature control circuit 126 will assert a signal on output line 132 to turn on switch 134, allowing the cells of the second battery cell circuit 140 to discharge through the resistive heating element 138, causing the resistive heating element 138 to produce heat. The resistive heating element 138 can be a nichrome (nickel-chromium alloy) wire element. In some embodiments the switch 134 can be configured to operate in a linear mode to act as a resistance and generate heat. Other functionally equivalent electrically resistive elements will occur to those skilled in the art.

While heating the first battery cell circuit 108, the temperature control circuit 126 monitors the temperature of the first battery cell circuit 108. If, or when the temperature of the first battery cell circuit 108 rises to an upper temperature threshold, the temperature control circuit 126 deactivates the resistive heating element 138. The upper temperature threshold can be, for example, −15 degrees Celsius. Although still below the nominal operating temperature range of many commercial battery cells, there is a substantial increase in output capacity at the higher temperature, which can allow use of the device 104 as intended, even if for less time than would be obtained at even higher temperatures.

The temperature control circuit 126 can be activated only when the battery 102 is connected to the device 104 so as to avoid discharge of battery cells of the first battery cell circuit 108 when not in use. For example, the battery 102 can have an auxiliary contact 116 which can be used, for example, to provide access to a data memory 118. The data memory 118 can use a single wire communication protocol which asserts a high voltage on line 122 via the auxiliary contact 116. To initially turn on the temperature control circuit 126, voltage from the first battery cell circuit 108 can be routed through the device 104 (e.g. as indicated by dashed line 162) to the auxiliary contact 116 and line 122. Even when very cold, the battery cells of the first battery cell circuit 108 can provide enough voltage to turn on a switch 124 to activate the temperature control circuit. The switch 124 can also be an N-type MOSFET and ins connected between the return or ground terminal of the temperature control circuit 126 and the return line (i.e. between contacts 114, 158). The voltage on line 122 can be provided to the gate terminal of switch 124, even when the device 104 is turned off, or is unable to operate due to high internal impedance due to the cold temperature of the battery 102. Upon the first battery cell circuit 108 becoming warm enough to provide power to the device 104, the device 104 may, in some embodiments, communicate with the data memory 118. To prevent the switch 124 from being affected by the digital communication signals on line 122 a series diode 120 can be used to block low levels on line 122 from turning off switch 124 as the gate capacitance of the switch 124 can store charge sufficient to maintain the switch 124 on while data communication occurs on line 122 (keeping in mind that line 122 is normally high for single wire communication to keep data memory 118 powered).

Charger 106 can charge both the cells of the first battery cell circuit 108 and the cells of the second battery cell circuit 140, through the first positive charger contact 152 and the second positive charger contact 154, respectively. The charger 106 can apply voltage and current through each positive charger contact 152, 154 in accordance with known charging regimes for the cells of the first battery cell circuit 108 and the cells of the second battery cell circuit 140 independently. For example, the first battery cell circuit 108 can be charged using a constant current to constant voltage regime, as is conventional for charging many lithium-based battery cells. The second battery cell circuit 140 can be charged using a constant current charger regime that monitors voltage and/or temperature to determine an end of charge condition. In some embodiments the charger 106 can use an adapted charging regime designed to charge, for example, a series of six cells of the type used in the second battery cell circuit.

However, in order to minimize the size and weight of the battery 102, the second battery cell circuit can be designed to include less than six cells, potentially even just one cell. In order to produce sufficient voltage, then, to imitate a six cell battery, a diode array 144 can be used to generate more voltage while charging the cell or cells of the second battery cell circuit 140. The diode array 144 can comprise several diodes connected in series between the second positive charging contact 154 and the second battery cell circuit 140. While charging, the power dissipated by the diode or diodes in the diode array 144 can cause self-heating, and resulting in a decrease in junction voltage. This drop in voltage can be perceived by the charger as an indication of an end of charge condition since a decrease of voltage under a constant current charge is one criteria used for determining end of charge. But once the charging current is ceased and the trickle current is then applied (which is typically on the order of $1/10^{th}$ the charging current), the voltage at the second positive charging contact 154 will drop to a level low enough to cause the charging to resume. While the charging is commencing, the charger 106 can also monitor the temperature of the second battery cell circuit 140 via a thermistor 148 which is located in thermal proximity to the second battery cell circuit 140 and connected between a thermistor contact 156 and the return line, as is conventional. The voltage at the thermistor contact 156 can be monitored by the temperature control circuit 126 via line 150 in order to determine when the battery 102 is connected to the charger 106 so that the switch 134 can be shut off to prevent charging current from passing through the resistive heating element 138. In some embodiments, where the thermistor 148 is not present, line 150 can instead be connected to the second positive charging contact 154 to detect the presence of voltage, indicating connection to the charger 106.

The temperature control circuit 126 can be implemented in a variety of circuit arrangements, including discrete circuit components, or even a microcontroller. In some embodiments a simple comparator using hysteresis to set the lower and upper temperature thresholds can be used to compare voltage provided by the thermistor (when appropriately biased with a temperature stable resistance, for example), to a temperature stable reference voltage. Furthermore, although a single charger 106 is shown here, it is contemplated that in some embodiments two different chargers can be used where one charger is configured to charge the cells of the first battery cell circuit 108 and a second charger is configured to charge the cells of the second battery cell circuit 140. Likewise, the first and second positive charging contacts 152, 154 can be located so as to properly connect to different chargers. In that way each charger can be dedicated to charge cells of the first or second type, and legacy chargers can be used without having to design, or have access to a charger configured to charge both types of battery cells at the same time.

Figure 2:
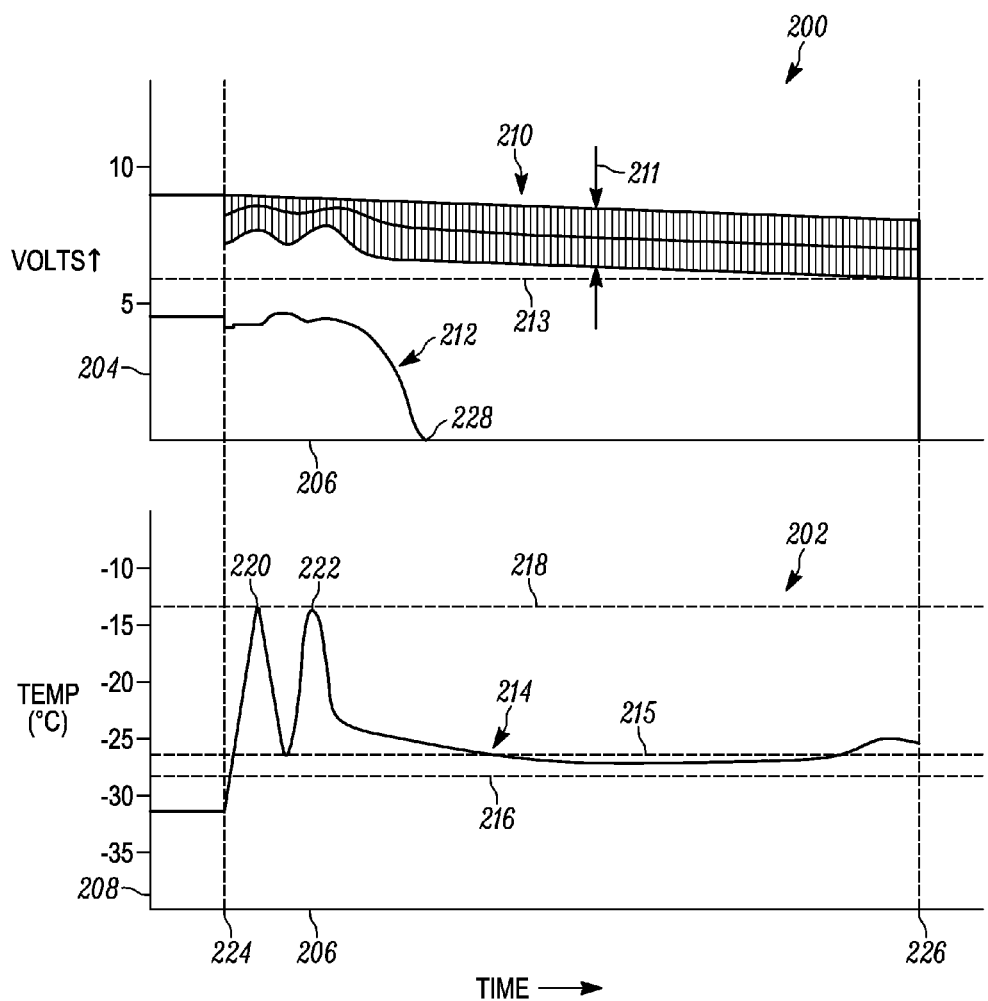
FIG. 2 is a graph chart diagram showing operation of a self-heating battery in accordance with some embodiments.

FIG. 2 is a graph chart diagram showing operation of a self-heating battery in accordance with some embodiments. The first graph 200 shows voltage over time for the first and second battery cell circuits, while the lower graph 202 shows temperature over time. Accordingly, the vertical axis 204 of the upper graph 200 is in units of volts, and the vertical axis 208 of the lower graph is in units of degrees Celsius, and both graphs 200, 202 have a horizontal axis 206 in units of time. Both graphs show operation for powering a device under very cold conditions. The results shown here are similar to experimental results obtained by testing a battery constructed similarly to that shown in FIG. 1.

The upper graph 200 shows a voltage plot 210 for the voltage provided by the first battery cell circuit, and the a voltage plot 212 showing voltage of the second battery cell circuit. The lower graph 202 shows a battery temperature plot 214, which is shown as being initially slightly below −30 degrees Celsius, marked by dashed line 216, horizontally, below which the cells of the first battery cell circuit are rendered substantially inoperative. The first battery cell circuit initially has an open circuit voltage of approximately 7.5-8 volts, and the second battery cell circuit initially has about 3 volts. At time 224 the discharge process begins. Because the battery temperature is below the lower threshold 215, the second battery cell circuit is enabled to discharge through a resistive heating element to heat up the first battery cell circuit. The device is simulated using a 5-5-90 duty cycle discharge regime, where a battery is discharged at a very low rate for 90% of the time, at a medium rate for 5% of the time, and at a high rate for 5% of the time. This simulates the operation of a portable two-way radio device operating in standby, receive, and transmit modes, respectively. Accordingly, the voltage plot 210 has a variation 211 where it has a higher voltage during standby periods and a lower voltage during high current periods. Also, at time 224, the initial voltage drop of the voltage 210 of the first battery cell circuit can be seen to drop significantly due to the cold temperature of the battery, which can be close to, if not below a shutdown threshold 213 at which the device would normally shut off to avoid over-discharging the cells of the first battery cell circuit. As heating continues, as indicated by temperature plot 214, the temperature can reach an upper threshold 218 at peak 220, causing the temperature control circuit to deactivate heating. When the temperature then falls below the lower threshold 215, the temperature control circuit can reactivate heating, resulting in a second peak 222. The second battery cell circuit can be completely discharged by the second peak 222 as the voltage (plot 212) falls to a low level at 228. Thereafter, the residual heat and self-heating of the cells of the first battery cell circuit can keep the cells of the first battery cell circuit warm enough to allow a significant period of operation until, at time 226, the voltage of the first battery cell circuit falls to the shutdown threshold 213. The results obtained from experiments indicate a substantial increase on the order of 75% in the effective capacity of the battery at very cold temperatures by using a self-heating scheme such as exemplified by embodiments such as in FIG. 1.

Figure 3:
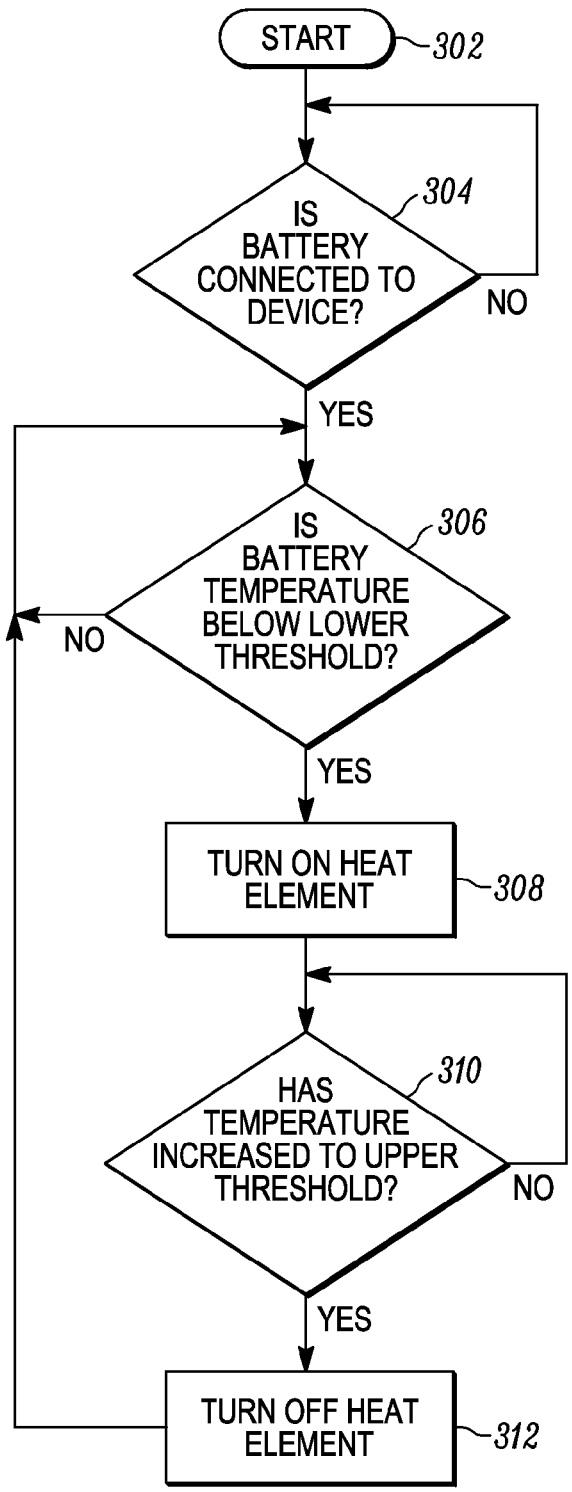
FIG. 3 is a flowchart diagram of a method for self-heating a battery in accordance with some embodiments.

FIG. 3 is a flowchart diagram 300 of a method for self-heating a battery in accordance with some embodiments. At the start 302, it is assumed that both the first and second battery cell circuits of a self-heating battery such as that shown in FIG. 1 are charged, and that the temperature is cold enough to cause the self-heating process to start by discharging the second battery cell circuit through the resistive heating element. Step 304 determines whether the battery is connected to the device to be powered. This step can be before, for example, by providing a voltage from the first battery cell circuit to the temperature control circuit through the device, via an auxiliary contact which turns on the temperature control circuit. In step 306 the temperature control circuit can determine the present temperature of the battery, specifically of the cells of the first battery cell circuit, and determine whether the temperature is below the lower temperature threshold. At this point the heating process has not been activated, so, for example, current through the resistive heating element from the second battery cell circuit is blocked, such as by a switch controlled by the temperature control circuit. If the temperature control circuit determines that the temperature is below the lower temperature threshold, the method proceeds to step 308 where the heating element is turned on. The second battery cell circuit is discharged internally to the battery through the resistive heating element to heat up the first battery cell circuit. In step 310 the method 300 determines whether the temperature of the battery has increased above the upper temperature threshold. If not, it continues to discharge the second battery cell circuit through the resistive heating element. If so, then in step 312 the heating element is turned off, and the method returns to step 306. The method can loop through several times until the second battery cell circuit is discharged completely, or the battery temperature remains above the lower temperature threshold.

Embodiments in accordance with those disclosed herein provide the benefit of increasing the effective capacity that is able to be obtained from a cold battery using certain types of battery cells to power a portable device. When certain cells having a high energy storage density get very cold, their effective capacity can be nearly eliminated, especially if the device being powered by the battery draws significant current levels. By heating the battery cells used to power the device, the internal impedance of those battery cells is reduced, thereby resulting in a lower voltage drop than if the battery cells remained cold. To produce the heat a second set of cells is used to discharge through a resistive heating element, as controlled by a temperature control circuit that can monitor battery temperature.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A self-heating battery pack, comprising:
    a first battery cell circuit including at least one battery cell of a first chemistry, and having a positive terminal coupled to a positive device contact and a negative terminal coupled to a negative device contact, and which is rendered substantially inoperative when below a minimum operating temperature;
    a heating circuit including a second battery cell circuit comprised of at least one battery cell of a second chemistry that is operable below the minimum operating temperature of the first battery cell circuit, the heating circuit further including a heating element that is located in proximity to the first battery cell circuit and which is powered by the second battery cell circuit;
    a temperature control circuit that senses a temperature of the first battery cell circuit and enables the heating circuit when the temperature is below a lower temperature threshold and disables the heating circuit when the temperature is above an upper threshold, and which is enabled by a signal from an auxiliary device contact; and
    wherein both the at least one battery cell of a first chemistry and the at least one battery cell of a second chemistry are rechargeable.

2. The self-heating battery pack of claim 1, wherein the heating element is a nichrome element.

3. The self-heating battery pack of claim 1, wherein the at least one battery cell of the first chemistry is at least one lithium-based battery cell.

4. The self-heating battery pack of claim 1, further comprising:
    a set of device contacts for interfacing with a device to be powered by the self-heating battery pack, and including the positive device contact, the negative device contact, and the auxiliary device contact; and
    a set of charging contacts for interfacing with a battery charger including a first positive charger contact for charging the at least one cell of the first chemistry, a second positive charger contact for charging the at least one cell of the second chemistry, a negative charger contact, and a thermistor contact.

5. The self-heating battery pack of claim 4, wherein the thermistor contact is coupled to a thermistor that is in thermal proximity to second battery cell circuit.

6. The self-heating battery pack of claim 4, wherein the thermal control circuit is only enabled by a voltage received at the auxiliary device contact.

7. The self-heating battery pack of claim 6, further comprising a switch transistor coupled to the thermal control circuit, between the thermal control circuit and the negative device contact, wherein the switch transistor is responsive to the signal received at the auxiliary device contact to connect the thermal control circuit to the negative device contact upon receiving the signal received at the auxiliary device contact.

8. The self-heating battery pack of claim 1, further comprising:
    a set of charging contacts for interfacing with a battery charger including a first positive charger contact for charging the at least one cell of the first chemistry, a second positive charger contact for charging the at least one cell of the second chemistry, a negative charger contact, and a thermistor contact; and
    a plurality of diodes connected in series, wherein the series-connected plurality of diodes are connected in further series between the second positive charger contact and the at least one battery cell of the second chemistry.

9. A method of operating a portable self-heating battery pack, comprising:
    determining whether the self-heating battery pack is connected to a portable device to be powered;
    in response to determining that the self-heating battery pack is connected to the portable device to be powered, enabling a temperature control circuit by providing a voltage from a first battery cell circuit to the temperature control circuit;
    determining, by the temperature control circuit, that a temperature of the first battery cell circuit is below a lower temperature threshold;
    in response to determining that the first battery cell circuit is below the lower temperature threshold, the temperature control circuit enabling discharge of a second battery cell circuit through a resistive heating element that is in thermal proximity to the first battery cell circuit; and
    subsequent to the enabling discharge of the second battery cell circuit through the resistive heating element, disabling discharge of the second battery cell circuit when the temperature of the first battery cell circuit is above an upper temperature threshold; and wherein
    the self-heating battery pack first battery cell circuit and the second battery cell circuit are rechargeable.

10. The method of claim 9, wherein determining that the temperature of the first battery cell circuit is below the lower temperature threshold and above the upper temperature threshold is performed using a thermistor that is in thermal proximity to the first battery cell circuit.

11. The method of claim 9, wherein enabling and disabling discharge of the second battery cell circuit through the resistive heating element is performed by turning on and off, respectively, a transistor switch connected in series with the resistive heating element between the second battery cell circuit and a ground.

12. The method of claim 9, wherein enabling the temperature control circuit comprises:
    connecting the self-heating battery pack to a portable electronic device to be powered by the self-heating battery pack; and
    providing a voltage from the first battery cell circuit to a switch connected between the temperature control circuit and either a ground or a power source through the device via an auxiliary contact of the device.

13. The method of claim 12, wherein providing the voltage from the first battery cell circuit via the auxiliary contact comprises providing the voltage via a data contact which is further connected to a data storage device in the self-heating battery pack.

14. The method of claim 9, further comprising, subsequent to disabling the discharge of the second battery cell circuit through the resistive heating element, re-enabling discharge of the second battery cell circuit through the resistive heating element upon the temperature of the first battery cell circuit falling below the lower temperature threshold.

15. A battery pack for a portable two-way radio device, comprising:
    a set of charger contacts for connecting the battery pack to a charger and including a first positive charger contact and a second positive charger contact;
    a set of device contacts for electrically connecting the battery pack to the portable two-way radio device, and including a positive device contact, a negative device contact, and an auxiliary contact;

a first battery cell circuit including at least one battery cell of a first chemistry, and having a positive terminal coupled to the positive device contact and the negative terminal coupled to the negative device contact, and which is rendered substantially inoperative when below a minimum operating temperature;

a charging protection diode connected between the positive terminal of the first battery cell circuit and the first positive charger contact;

a second battery cell circuit comprised of at least one battery cell of a second chemistry that is operable below the minimum operating temperature of the first battery cell circuit;

a resistive heating element that is located in proximity to the first battery cell circuit and which is connected to the second battery cell circuit;

a temperature control circuit that senses a temperature of the first battery cell circuit and discharges the second battery cell circuit through the resistive heating element when the temperature of the first battery cell circuit is below a lower temperature threshold and disables discharge of the second battery cell circuit through the resistive heating element when the temperature of the first battery cell circuit is above an upper threshold.

16. The battery pack of claim 15, wherein the resistive heating element is a nichrome element.

17. The battery pack of claim 15, wherein the at least one battery cell of the first chemistry is at least one lithium-based battery cell.

18. The battery pack of claim 15, wherein set of charger contacts further includes a thermistor contact that is coupled to a thermistor in the battery pack that is in thermal proximity to second battery cell circuit.

19. The battery pack of claim 15, wherein the temperature control circuit is only enabled by a voltage received at the auxiliary device contact.

20. The battery pack of claim 15, further comprising a plurality of diodes connected in series, wherein the series-connected plurality of diodes are connected in further series between the second positive charger contact and the second battery cell circuit.

21. The self-heating battery pack of claim 2, wherein the at least one battery cell of the second chemistry is at least one nickel-based battery cell.

22. The method of claim 9, wherein the at least one battery cell of the first chemistry is at least one lithium-based battery cell; and the at least one battery cell of the second chemistry is at least one nickel-based battery cell.

23. The battery pack of claim 17, wherein the at least one battery cell of the second chemistry is at least one nickel-based battery cell.

24. The self-heating battery pack of claim 1, wherein the self-heating battery pack is packaged in a unitary battery pack for mechanically coupling and powering a portable electronic device.

25. The method of claim 9, wherein the self-heating battery pack is packaged in a unitary battery pack for mechanically coupling and powering a portable electronic device.

26. The battery pack of claim 15, wherein the self-heating battery pack is packaged in a unitary battery pack for mechanically coupling and powering a portable electronic device.

* * * * *